March 5, 1946. T. E. CLIFTON 2,396,085
SHREDDING MACHINE
Filed Oct. 11, 1943 2 Sheets-Sheet 1
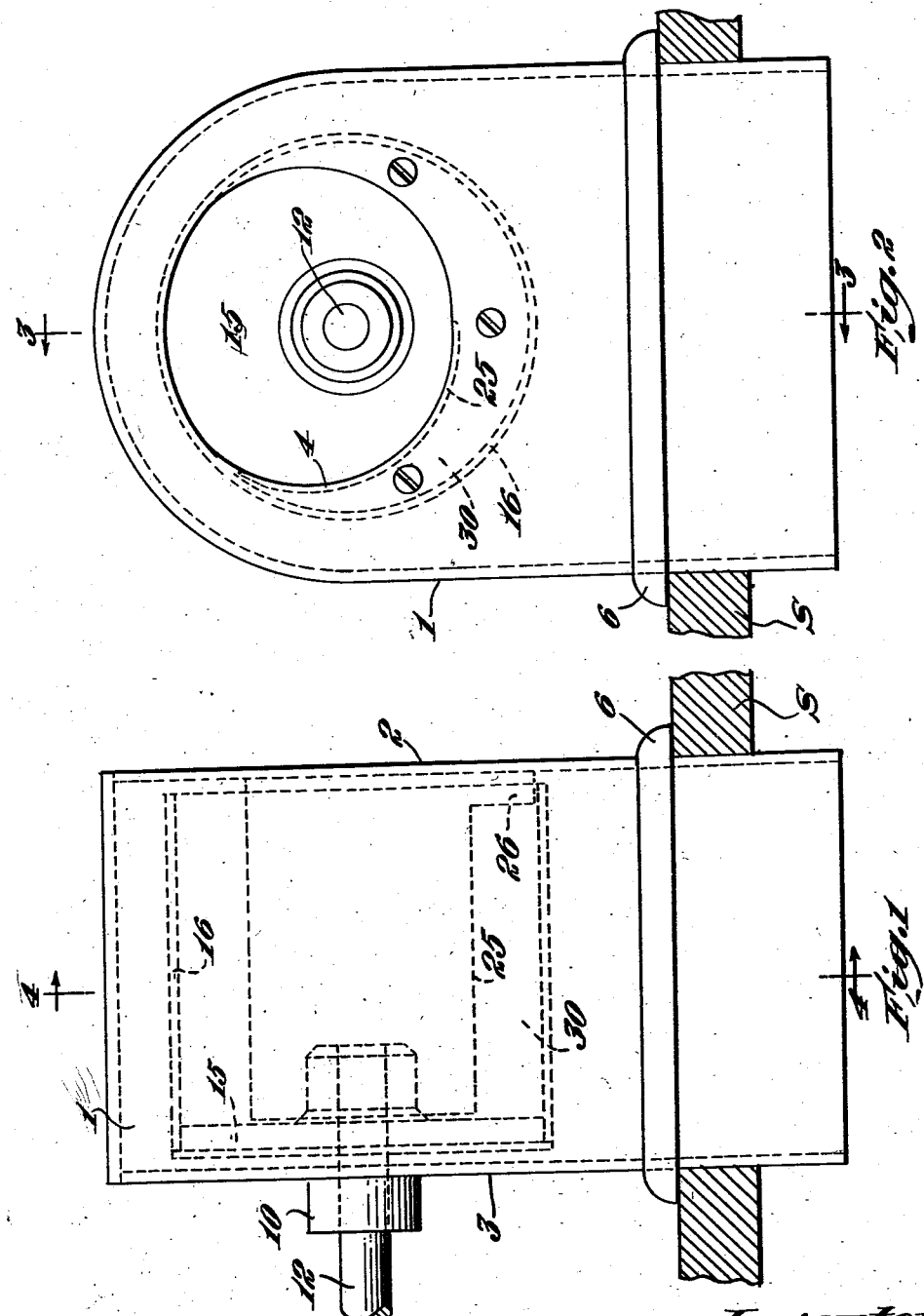
Inventor
Theodore E. Clifton March 5, 1946.   T. E. CLIFTON   2,396,085
SHREDDING MACHINE
Filed Oct. 11, 1943   2 Sheets-Sheet 2

Inventor
Theodore E. Clifton
by Roberts, Cushman & Grover
Attys.

Patented Mar. 5, 1946

2,396,085

UNITED STATES PATENT OFFICE 2,396,085

SHREDDING MACHINE

Theodore E. Clifton, Hyannis, Mass.

Application October 11, 1943, Serial No. 505,748

2 Claims. (Cl. 146—90)

This invention relates to an apparatus for shredding fruit, vegetables and the like products, the principal object being to provide an apparatus which is of simple design, embodying a minimum number of parts, which is of strong and durable construction and which is efficient and reliable in operation.

Further objects will be apparent from a consideration of the following description and accompanying drawings, wherein:

Fig. 1 is a front elevation of a shredding apparatus constructed in accordance with the present invention;

Fig. 2 is a side elevation of the apparatus shown in Fig. 1;

The particular apparatus here shown for the purpose of illustration is designed for shredding oranges, although it is to be understood that the apparatus may be used for shredding vegetables and various types of fruits without material modification of the construction and arrangement of parts presently to be described.

Figure 4:
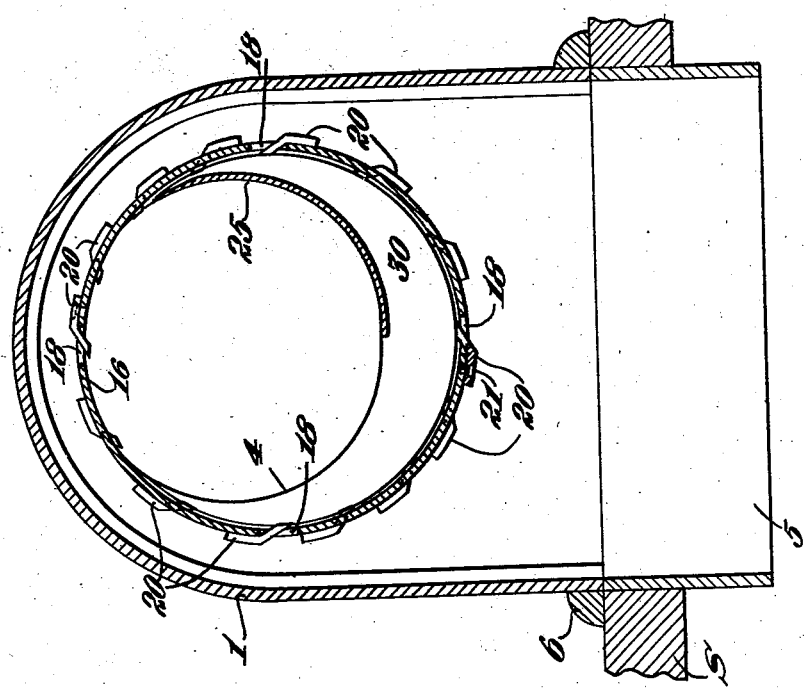
Fig. 4 is a section on the line 4—4 of Fig. 1.
Figure 3:
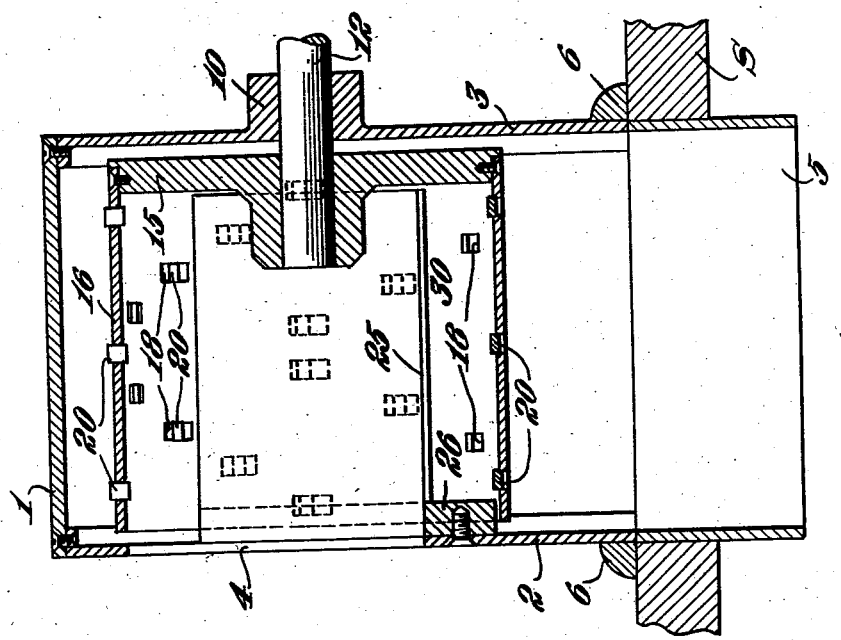
Fig. 3 is a section on the line 3—3 of Fig. 2.

The apparatus may be made from any suitable material such as stainless steel, tin-plate or the like material which is resistant to corrosion, and comprises a hood or housing 1 of U-shaped cross section (Fig. 4) having end walls 2 and 3, the end wall 2 being formed with a circular entrance or inlet opening 4 and the bottom of the hood being open so as to provide a discharge port 5, as shown in Figs. 3 and 4.

A moulding 6 or the like extends about the base portion of the hood so as to provide a shoulder portion adapted to sit squarely on the marginal portion of an opening formed in a table top, container cover or other suitable supporting structure S. The end wall 3 is formed with a boss 10 having an opening which provides a bearing for rotatably supporting a drive shaft 12, the inner end of which extends a short distance within the interior of the hood, as shown in Fig. 3.

The inner end of the shaft 12 is pinned or otherwise secured to the hub of a circular flange 15, the periphery of which is stepped or shouldered so as to receive the inner end portion of a rotatable cylinder 16 which is screwed or otherwise suitably secured thereto. The cylinder 16 extends from one end wall to the other with its ends in closely spaced relation thereto and its free end being spaced inwardly of the edge of the inlet opening 4, as shown in Figs. 3 and 4. The peripheral wall of the cylinder is formed with a plurality of spaced radially offset slots 18 which are so arranged with respect to one another that in each circumferential zone (the width of which is slightly greater than that of a slot), there are four slots spaced 90° apart and in the next adjacent zone the slots are similarly arranged but are radially offset, etc., as shown more clearly in Fig. 3.

A knife 20 is suitably secured, as shown at 21 in Fig. 4, to the peripheral wall of the cylinder 16 adjacent to each slot so that its cutting edge projects inwardly through the slot and beyond the inner wall with the cutting edge extending in the direction of the intended rotation of the cylinder, the construction and arrangement of parts being such that sufficient clearance is provided between each knife and the opposite edge of the slot to accommodate the passage of shredded material through the slots. Since this particular embodiment is designed to shred oranges, the diameter and length of the cylinder 16 are of the order of eight inches and the dimensions of all other parts herein shown and described are in approximate proportion to those indicated for the cylinder, it being understood that these dimensions are considered optimum for oranges and the like, but for produce having different physical characteristics it may be advisable, if not necessary, to vary the dimensions.

One end of a curved baffle 25 is rigidly secured to a flange or the like member 26 fixed to the inner face of end wall 2. The baffle 25 extends within the cylinder 16 at such an angle to its peripheral wall as to provide a wedge-shaped shredding chamber 30 which extends or tapers in the direction of the intended rotation of the cylinder 16, as shown in Fig. 4. The baffle 25 is preferably in the form of a section of a cylinder having a diameter approximately the same as that of the inlet opening 4 and is mounted so that its outer edge coincides with the lower side edge of the opening 4, as shown in Fig. 2, in which position the baffle provides a guide member effective to support the material to be shredded so that it drops by gravity from the lower edge of the baffle directly into the enlarged end of the shredding chamber 30.

The shaft 12 may be directly coupled with a motor (not shown) or connected at a line shaft or other suitable source of power capable of rotating the cylinder 16, in a counterclockwise direction as viewed in Fig. 4, at the desired speed.

In using the apparatus the material to be shredded is fed through the opening 4 and the rotating cylinder 16 operating in conjunction with the baffle 25 carries the material into the shredding chamber 30 which, due to its wedge shape, forces it against the revolving knives 20. The shreds or cuttings are forced through the clearance between the knives 20 and the opposite edge of slots 18 and are thrown outwardly by centrifugal force against the curved hood which serves as a deflector conducting the shredded material through the discharge opening 5. Since the hood 1 provides a housing about the operating parts, all juices, essential oils, etc., contained in the material being shredded, as well as the more stable constituents, are conducted through the outlet 5 directly into a suitable receptacle.

While I have shown and described one desirable embodiment of the invention, it is to be understood that this disclosure is for the purpose of illustration and that various changes in shape, proportion and arrangement of parts, as well as the substitution of equivalent elements for those herein shown and described, may be made without departing from the spirit and scope of the invention as set forth in the appended claims.

I claim:

1. Apparatus for shredding fruit, vegetables and like products, comprising a hood of inverted U-shape cross-section having side walls, one of which is formed with a small circular opening and the opposite side wall being formed with a large circular opening having its center disposed above the center of said small circular opening and providing an entrance opening, the bottom of said hood being open to provide a discharge opening, a rotatable shaft having one end projecting through said small opening into the interior of said hood, a cylinder mounted on the projecting end of said shaft with its side wall spaced from the interior side wall of said hood, a plurality of circumferentially spaced cutting knives carried by said cylinder and having their cutting edges extending inwardly in the direction of intended rotation of said cylinder, and a curved baffle member approximately concentric with said entrance opening, said baffle being secured to the marginal portions of said hood about said entrance opening and projecting into the interior of said cylinder with its lower edge below the axis of said shaft and its body portion extending upwardly with its upper edge spaced from the path of travel of said knives, thereby providing a wedge-shaped shredding chamber tapering upwardly in the direction of intended rotation of said cylinder, the enlarged end of said shredding chamber communicating with said entrance opening in said hood and the lower body portion of said baffle providing a receiving guide operative to permit material fed through said entrance opening to drop into said enlarged end of said shredding chamber.

2. Apparatus for shredding fruit, vegetables and the like products, comprising a hood of inverted U-shape cross-section having side walls, one of which is formed with a small circular opening and the opposite side wall being formed with a large circular opening having its center disposed above the center of said small circular opening and providing an entrance opening, the bottom of said hood being open to provide a discharge opening, a rotatable shaft having one end projecting through said small opening into the interior of said hood, a circular member rigidly secured to the projecting end of said shaft within said hood, a cylinder having one end rigidly secured to the periphery of said circular member with its side wall spaced from the interior side wall of said hood, said cylinder being formed with a plurality of circumferentially spaced axially offset slots, cutting knives mounted on the exterior of said cylinder and having their central portions bent inwardly so that their cutting edges extend through said slots in the direction of intended rotation of said cylinder inwardly beyond the interior periphery of said cylinder, and a curved baffle member approximately concentric with said entrance opening, said baffle being secured to the marginal portions of said hood about said entrance opening and projecting into the interior of said cylinder with its lower edge below the axis of said shaft and its body portion extending upwardly with its upper edge spaced from the path of travel of said knives, thereby providing a wedge-shaped shredding chamber tapering upwardly in the direction of intended rotation of said cylinder, the enlarged end of said shredding chamber communicating with said entrance opening in said hood and the lower body portion of said baffle providing a receiving guide operative to permit material fed through said entrance opening to drop into said enlarged end of said shredding chamber.

THEODORE E. CLIFTON.